United States Patent Office 3,421,981
Patented Jan. 14, 1969

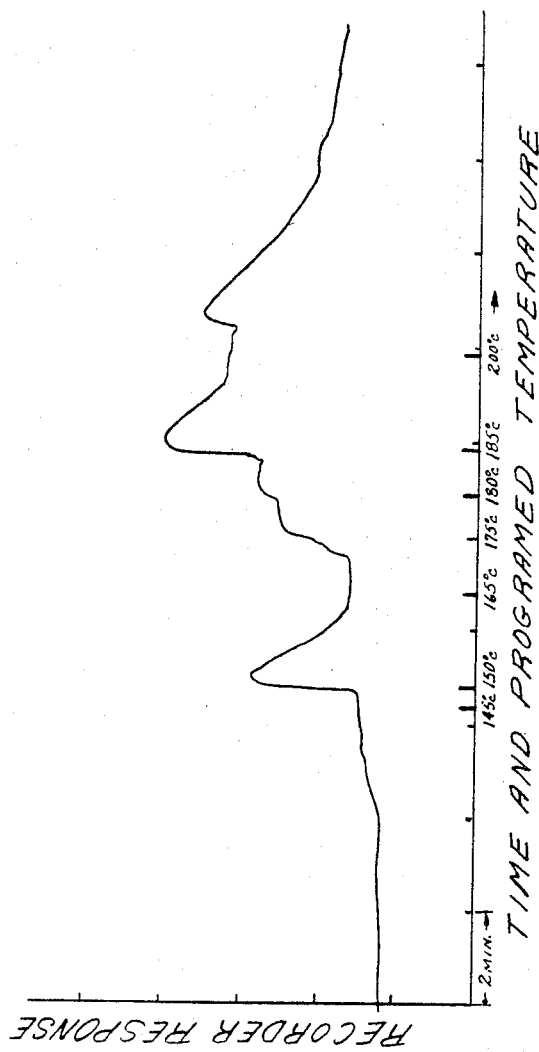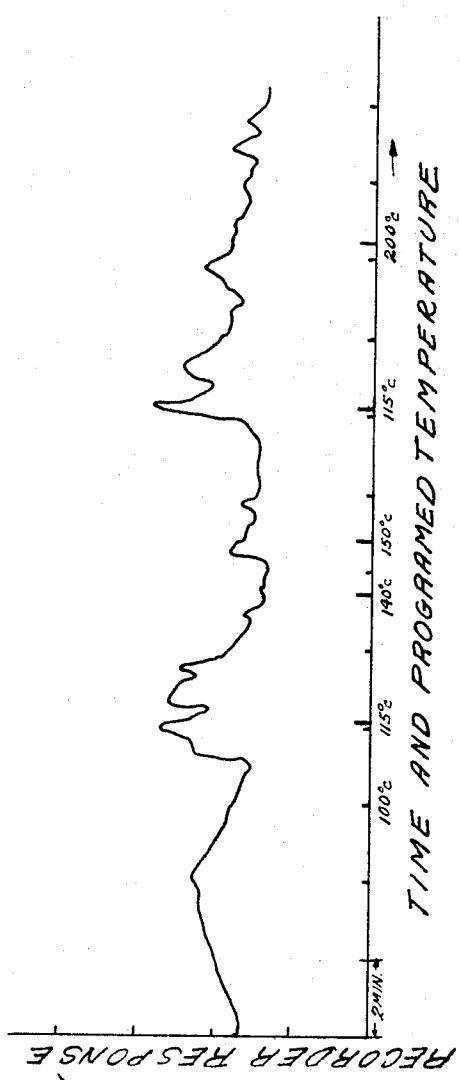

3,421,981
PRODUCTION OF THERAPEUTIC AND PROPHYLACTIC AGENT FOR UPPER RESPIRATORY INFECTIONS
Byron E. Leach, Alexandria, Va., assignor, by mesne assignments, to Byron E. Leach, Memphis, Tenn., Richard G. Hibbs, New Orleans, La., George T. Mobille, Washington, D.C., and William R. Klein, Vienna, Va.
Filed June 9, 1965, Ser. No. 462,536
U.S. Cl. 195—80         4 Claims
Int. Cl. A61k 13/00; C12d 9/00

ABSTRACT OF THE DISCLOSURE

A process for making a therapeutic and prophylactic agent for the treatment of upper respiratory infections is disclosed, wherein an acidic fermentation beer is treated with absorptive material, the absorptive material is eluted with a water-miscible alcohol or ketone, the eluting liquid is removed and extracted, the mother liquor remaining after the extraction is distilled to obtain a first distillate, and the first distillate is redistilled to obtain a second distillate. This distillate exhibits the desired properties and may be used as such, or may be subjected to certain additional purification steps.

---

This invention relates to a new therapeutic and prophylactic agent for the treatment of upper respiratory infections. The invention is more particularly concerned with improvements to the method described in my United States Patent No. 2,989,441, granted June 20, 1961, and to the product obtained therefrom.

According to the method of my aforesaid patent, a therapeutic and prophylactic agent for the treatment of upper respiratory infections is obtained by carrying out the following steps:

(1) Providing an acidic *Streptomyces griseus* fermentation beer and treating the beer with an activated adsorptive carbon.

(2) Eluting the adsorbed material therefrom with a water-miscible alcohol or ketone.

(3) Removing the eluting liquid and extracting cycloheximide from the resulting mixture.

(4) Distilling the mother liquor remaining after removal of the crystalline cycloheximide, and obtaining a distillate at a temperature of between 80 and 150° C. and at a pressure of from 200–600 microns.

(5) Redistilling the aforesaid distillate and obtaining a final distillate at a temperature of between 62° and 64° C. and at a pressure of about 150 microns. This final distillate is the end product of my said patent.

I have now found that I can obtain an improved product by modifying the aforesaid steps and by carrying out additional steps in obtaining such product. It is, therefore, the primary object of my invention to provide an improved method for obtaining an improved therapeutic and prophylactic agent for the treatment of upper respiratory infections of the type disclosed and claimed in my United States Patent No. 2,989,441.

Other objects of the invention will become apparent hereinafter.

As noted heretofore, the usual procedure for obtaining the prophylactic agent described in my United States Patent No. 2,989,441, involves a number of steps culminated by the redistillation of a distillate at a temperature of between 62° and 64° C. and at a pressure of about 150 microns to obtain the final desired product.

It is contemplated by my invention that the foregoing distillate can be subjected to conventional water extraction to remove water immiscible impurities thereby yielding a product possessing like therapeutic and prophylactic properties and exhibiting readings shown in FIGURE 1 when subjected to gas chromatography under the following conditions.

Column:
    Length _____ 6 ft.
    I.D. _____ ¼ mm.
Coating (Apeizon):
    Wt. percent _____ 10.
Support (Chromsorb):
    Mesh _____ 60/80.
Carrier gas ($N_2$):
    Rate _____ 62 ml./min.
Sensitivity _____ $10^2$—64.
Sample _____ Product as defined heretofore.
Temperatures:
    Column _____ Prog. ° C.
    Detector _____ 212° C.
    Sampler _____ 223° C.
Sample size _____ 2 mcl.
Chart speed _____ 5 div.=2 min.
Temp. rate _____ 7.5°/min.
Start at _____ 50° C.
Initial hold _____ 5 min.
Programmed _____ 20 min. at 7.5°/min.
Final hold _____ 200°.

Figure 2:
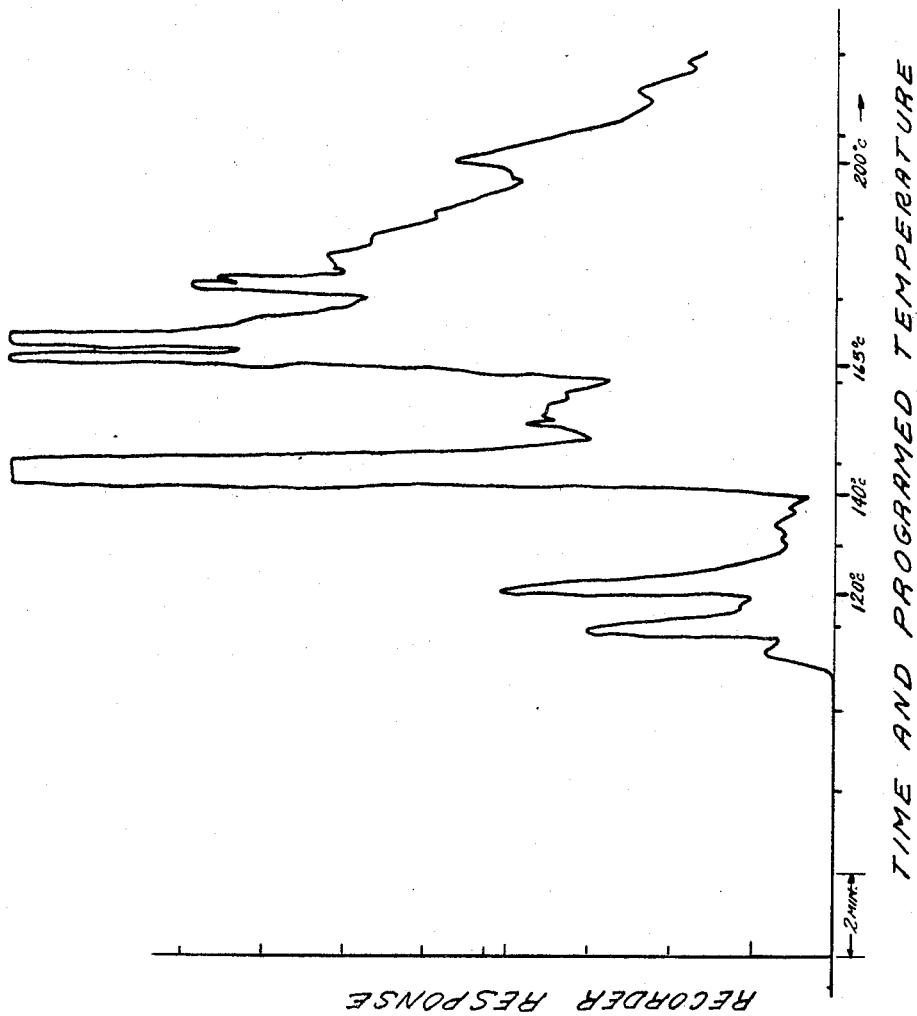

It should be noted that I can modify and expand the aforesaid steps in said patented method. Specifically, I have found that in the above-described redistillation step, a distillate can be taken at a temperature of between 100° and 135° C. and at a pressure of between 200 and 400 microns. This distillate, of itself, exhibits therapeutic and prophylactic properties against upper resipratory infections and exhibits readings of FIGURE 2 when subjected to gas chromatography under the following conditions.

Column:
    Length _____ 6 ft.
    I.D. _____ ¼ mm.
Coating (Apeizon):
    Wt. percent _____ 10.
Support (Chromsorb):
    Mesh _____ 60/80.
Carrier gas ($N_2$):
    Rate _____ 62 ml./min.
Sensitivity _____ $10^2$—64.
Sample _____ Product as defined heretofore.
Temperatures:
    Column _____ Prog. ° C.
    Detector _____ 212° C.
    Sampler _____ 223° C.
Sample size _____ 0.1 mcl.
Chart speed _____ 5 div.=2 min.
Temp. rate _____ 7.5°/min.
Start at _____ 50° C.
Initial hold _____ 5 min. at 7.5°/min.
Programmed _____ 20 min. at 7.5°/min.
Final hold _____ 200°.

However, the foregoing distillate (water-extracted or, as such), rather than constituting the final product may then be subjected to certain additional steps, all of which constitute the improved processes of the present invention. These steps can be summarized as follows:

ALTERNATIVE A (1) The above-described distillate is dissolved in ether, e.g., methyl or ethyl ether.
(2) The resulting ether solution is extracted with 5% sodium hydroxide and separated out from the immiscible sodium hydroxide layer.

(3) The extracted ether solution then constitutes the final desired product after evaporation of the ether therefrom by conventional methods.

Figure 3:
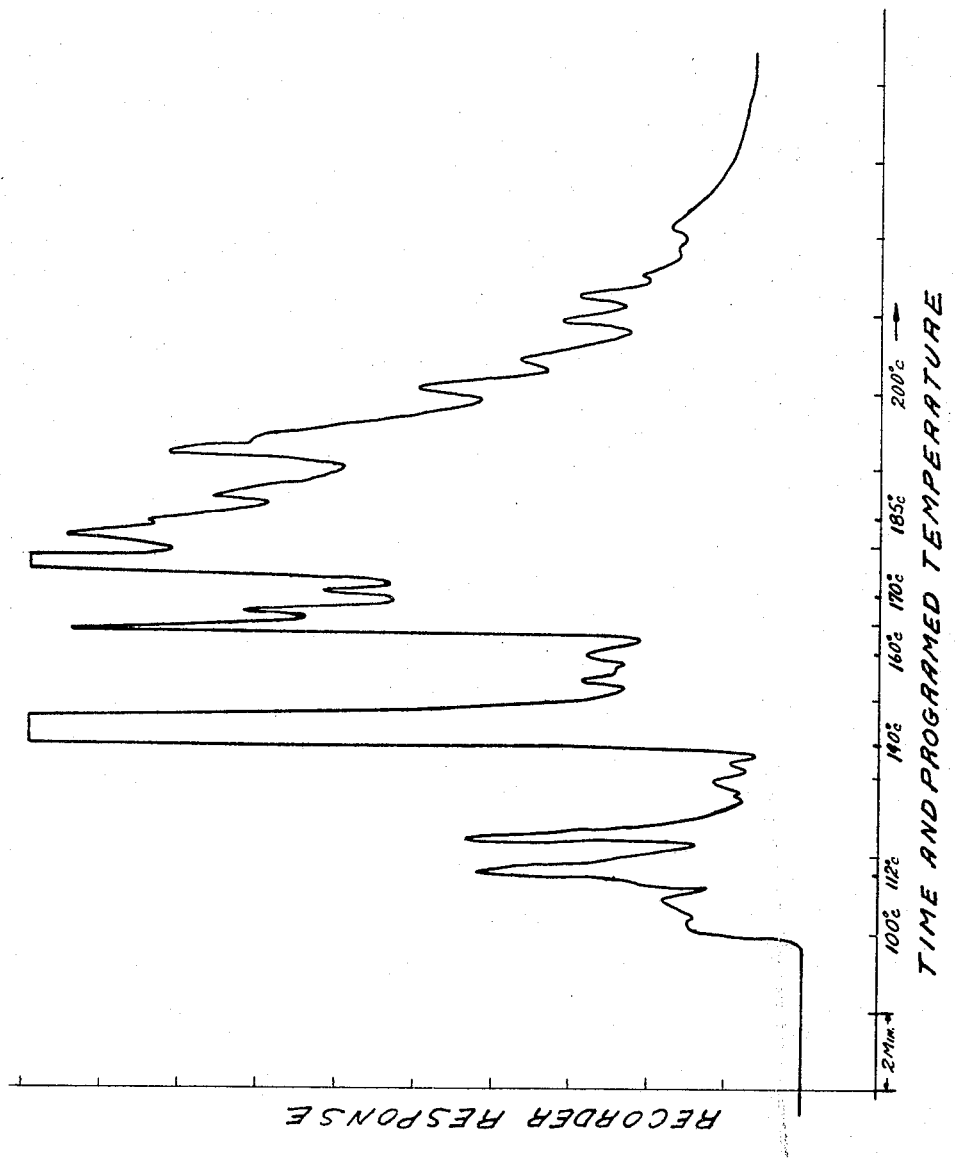

The resulting product exhibits readings of FIGURE 3 when subjected to gas chromatography under the following conditions.

Column:
 Length _____ 6 ft.
 I.D. _____ ¼ mm.
Coating (Apeizon):
 Wt. percent _____ 10.
Support (Chromsorb):
 Mesh _____ 60/80.
Carrier gas ($N_2$):
 Rate _____ 62 ml./min.
Sensitivity _____ $10^2$—64.
Sample _____ Product as defined heretofore.
Temperatures:
 Column _____ Prog. ° C.
 Detector _____ 212° C.
 Sampler _____ 223° C.
Sample size_____ 0.1 mcl.
Chart speed_____ 5 div.=2 min.
Temp. rate_____ 7.5°/min.
Start at_____ 50° C.
Initial hold_____ 5 min at 7.5°/min.
Programmed _____ 20 min. at 7.5°/min.
Final hold_____ 200°.

Following is an example of the above Alternative A.

(1) A distillate was obtained following the teaching of my aforesaid patent taken at a temperature of between 105° and 132° C. at about 200 microns.

(2) Ten ml. of the aforesaid distillate was dissolved in 400 ml. of ethyl ether.

(3) The resulting ether solution was extracted with 200 ml. of 5% sodium hydroxide and separated out from the immiscible sodium hydroxide layer.

(4) The extracted ether solution was then heated to evaporate out the ether by conventional method yielding 5 ml. of the final product (FIGURE 3) that, upon clinical testing, exhibited the therapeutic and prophylactic properties of the invention.

ALTERNATIVE B (1) The said above-described distillate is mixed with an anhydride, e.g., phthalic anhydride.

(2) The resulting mixture is heated up to four hours at 100°–120° C. in a sealed tube.

(3) The mixture is then allowed to cool and the excess anhydride is removed through the addition of a petroleum ether. The petroleum ether portion is evaporated to a residue that is hydrolyzed with an alkali, such as sodium hydroxide or potassium hydroxide.

(4) The solution resulting from this hydrolysis is then steam distilled and the distillate is extracted with ether, e.g., methyl or ethyl ether.

(5) The ether extract is evaporated in the usual way to drive off excess ether and results in obtaining the final product.

The resulting product exhibits readings of FIGURE 4 when subjected to gas chromatography under the following conditions.

Column:
 Length _____ 6 ft.
 I.D. _____ ¼ mm.
Coating (Apeizon):
 Wt. percent _____ 10.
Support (Chromsorb):
 Mesh _____ 60/80.
Carrier gas ($N_2$):
 Rate _____ 62 ml./min.
Sensitivity _____ $10^2$—64.
Sample _____ Produce as defined heretofore.
Temperatures:
 Column _____ Prog. ° C.
 Detector _____ 212° C.
 Sampler _____ 223° C.
Sample size_____ 0.6 mcl.
Chart speed_____ 5 div.=2 min.
Temp. rate_____ 7.5°/min.
Start at_____ 50° C.
Initial hold_____ 5 min at 7.5°/min.
Programmed _____ 20 min. at 7.5°/min.
Final hold_____ 200°.

Following is an example of the above Alternative B.

(1) A distillate was obtained following the teaching of my aforesaid patent taken at a temperature of between 105° and 132° C. at about 200 microns.

(2) Ten ml. of the above distillate was mixed with 10 grams of phthalic anhydride.

(3) The resulting mixture was heated for four hours at a temperature of 110° C. in a sealed tube.

(4) The mixture was then allowed to cool and the excess anhydride removed through the addition of 250 ml. of petroleum ether (boiling at 30°–60° C.). The resulting petroleum ether fraction was evaporated to a residue that was then hydrolyzed with 100 ml. of 5% potassium hydroxide in alcohol.

(5) The solution resulting from said hydrolysis was then steam distilled and the distillate extracted three times with ethyl ether.

(6) The final ether extract was then evaporated by heat to drive off excess ether and resulted in 2 ml. of the final product that, upon clinical testing, exhibited the therapeutic and prophylactic properties of the invention.

ALTERNATIVE C (1) The said above-described distillate is suspended in 30–40% of sodium bisulphite aqueous solution.

(2) The mixture is then heated for up to four hours with frequent shaking at a temperature of under 100° C.

(3) The mixture is then cooled to room temperature and extracted with ether, e.g., methyl or ethyl ether, to remove the unreacted material.

(4) The remaining solution is then treated with an alkali metal carbonate, e.g., potassium or sodium carbonate and the resulting solution is steam distilled at atmospheric pressure.

(5) The distillate is then extracted with a water immiscible solvent, e.g., methyl or ethyl ether, and the excess ether is evaporated off from the resulting extract which constitutes the final product.

Figure 5:
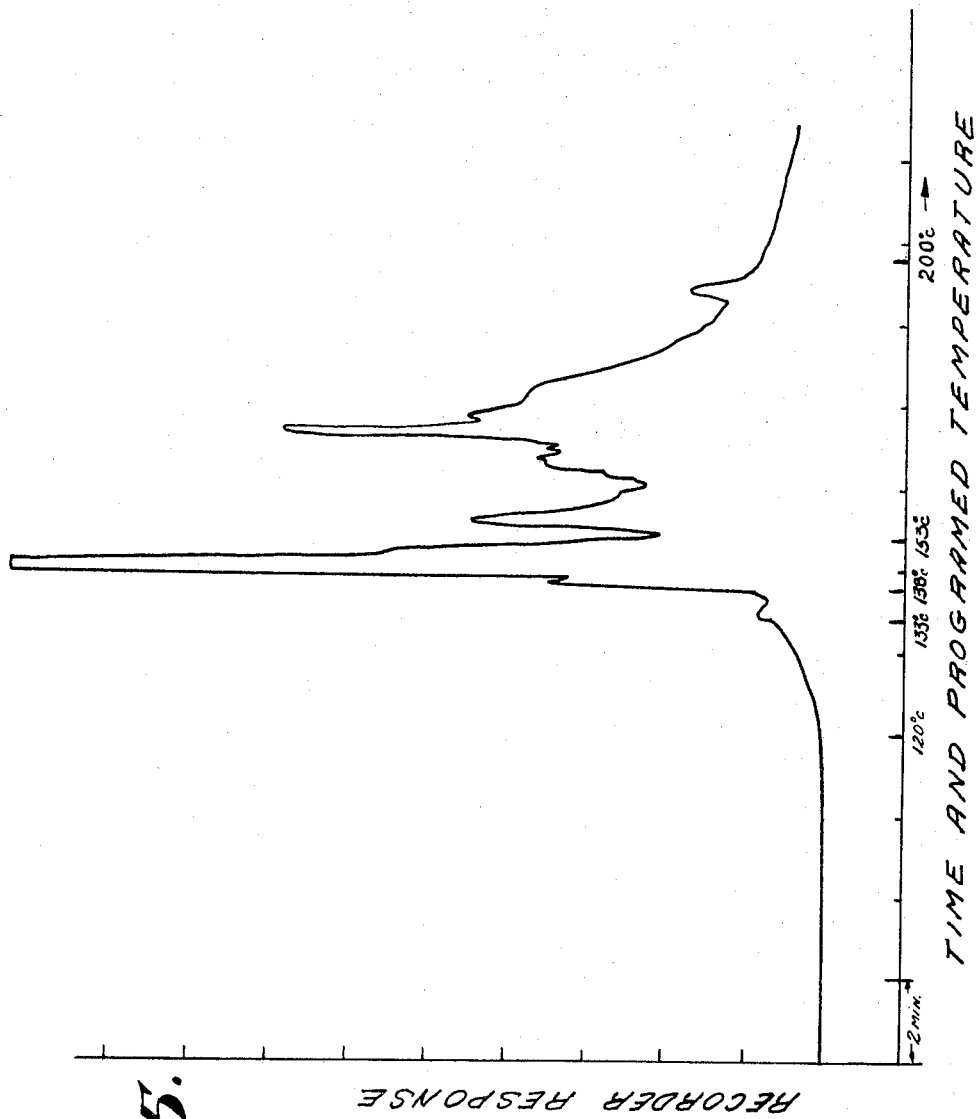

The resulting product exhibits readings of FIGURE 5 when subjected to gas chromatography under the following conditions.

Column:
 Length _____ 6 ft.
 I.D. _____ ¼ mm.
Coating (Apeizon):
 Wt. percent _____ 10.
Support (Chromsorb):
 Mesh _____ 60/80.
Carrier gas ($N_2$):
 Rate _____ 62 ml./min.
Sensitivity _____ $10^2$—64.
Sample _____ Product as defined heretofore.
Temperatures:
 Column _____ Prog. ° C.
 Detector _____ 212° C.
 Sampler _____ 223° C.
Sample size_____ Needle full (less than 0.1 mcl.).

| | |
|---|---|
| Chart speed | 5 div.=2 min. |
| Temp. rate | 7.5°/min. |
| Start at | 50° C. |
| Initial hold | 5 min. at 7.5°/min. |
| Programmed | 20 min. at 7.5°/min. |
| Final hold | 200°. |

Following is an example of the above Alternative C.

(1) A distillate was obtained following the teaching of my aforesaid patent taken at a temperature of between 105° and 132° C. at about 200 microns.

(2) Ten ml. of the aforesaid distillate was suspended in 27.5 ml. of 40% aqueous sodium bisulphite.

(3) The resulting mixture was then heated for four hours with frequent shaking in a steam bath at a temperature of about 90° C.

(4) The mixture was then cooled to room temperature and extracted three times with 100 ml. portions of ethyl ether.

(5) The remaining solution was then treated with 10 grams of potassium carbonate and subjected to steam distillation at atmospheric pressure.

(6) The distillate was then extracted three times with 100 ml. portions of ethyl ether and the excess ether was then evaporated off from the resulting extract to yield 1 ml. of the final product. Said product exhibited, upon clinical testing, the therapeutic and prophylactic properties of the invention.

The products of any of the foregoing alternative methods are normally utilized by application thereof to an adsorbent material such as cotton. The so-treated adsorbent material can then be suspended in a room and the product inhaled upon vaporization.

Extensive control tests were conducted using the alternative products and significant results were obtained from the standpoint of prophylaxis from upper respiratory infection.

Variations may be made without department from the spirit or scope of the invention and it is to be understood that I limit myself only as defined in the following claims.

I claim:

1. A process for making a therapeutic and prophylactic agent for the treatment of upper respiratory infections, wherein an acidic *Streptomyces griseus* fermentation beer is treated with adsorptive material, the adsorbed material is then eluted with a water miscible alcohol or ketone, the eluting liquid is removed and crystalline cycloheximide is extracted from the resulting mixture, the mother liquor remaining after removal of the crystalline cycloheximide is distilled to obtain a first distillate at a temperature of between 80° and 150° C. at a pressure of between 200 and 600 microns, and said first distillate is redistilled to obtain a second distillate at a temperature of between 100° and 135° C. at a pressure of between 200 and 400 microns.

2. In a process for making a therapeutic and prophylactic agent for the treatment of upper respiratory infections, wherein an acidic *Streptomyces griseus* fermentation beer is treated with adsorptive material, the adsorbed material is then eluted with a water-miscible alcohol or ketone, the eluting liquid is removed and crystalline cycloheximide is extracted from the resulting mixture, the mother liquor remaining after removal of the crystalline cycloheximide is distilled to obtain a first distillate at a temperature of between 80° and 150° C. at a pressure of between 200 and 600 microns, and said first distillate is redistilled to obtain a second distillate at a temperature of between 100° and 135° C. at a pressure of between 200 and 400 microns; the improvement comprising dissolving said second distillate in ether, extracting the resulting ether solution with an alkali metal hydroxide, separating out the immiscible hydroxide layer, and removing the ether from the remaining solution to give an end product.

3. In a process for making a therapeutic and prophylactic agent for the treatment of upper respiratory infections, wherein an acidic *Streptomyces griseus* fermentation beer is treated with adsorptive material, the adsorbed material is then eluted with a water-miscible alcohol or ketone, the eluting liquid is removed and crystalline cycloheximide is extracted from the resulting mixture, the mother liquor remaining after removal of the crystalline cycloheximide is distilled to obtain a first distillate at a temperature of between 80° and 150° C. at a pressure of between 200 and 600 microns, and said first distillate is redistilled to obtain a second distillate at a temperature of between 100° and 135° C. at a pressure of between 200 and 400 microns; the improvement comprising mixing said second distillate with an anhydride, treating the resulting mixture for about four hours from 100° to 120° C. in a sealed tube, removing the excess anhydride and hydrolyzing with an alkali, steam distilling the resulting solution and extracting with ether, then removing the excess ether to give an end product.

4. In a process for making a therapeutic and prophylactic agent for the treatment of upper respiratory infections, wherein an acidic *Streptomyces griseus* fermentation beer is treated with adsorptive material, the adsorbed material is then eluted with a water-miscible alcohol or ketone, the eluting liquid is removed and crystalline cycloheximide is extracted from the resulting mixture, the mother liquor remaining after removal of the crystalline cycloheximide is distilled to obtain a first distillate at a temperature of between 80° and 150° C. at a pressure of between 200 and 600 microns, and said first distillate is redistilled to obtain a second distillate at a temperature of between 100° and 135° C. at a pressure of between 200 and 400 microns; the improvement comprising suspending the second distillate in an alkali bisulphite aqueous solution and heating for up to four hours at a temperature of under 100° C., extracting the resulting mixture with ether and removing the unreacted material, treating the remaining solution with an alkali metal carbonate and steam distilling the resulting solution at atmospheric pressure, ether extracting the resulting distillate, removing the excess ether to give an end product.

References Cited

UNITED STATES PATENTS 2,989,441   6/1961   Leach _____ 195—80

FOREIGN PATENTS 878,825   1/1962   Great Britain.

MAURICE W. GREENSTEIN, *Primary Examiner.*

U.S. Cl. X.R.

167—65; 260—236.5